(12) United States Patent
Sun

(10) Patent No.: US 12,373,663 B2
(45) Date of Patent: Jul. 29, 2025

(54) RADIO-FREQUENCY IDENTIFICATION (RFID) TAG ASSEMBLY

(71) Applicant: ZEBRA TECHNOLOGIES CORPORATION, Lincolnshire, IL (US)

(72) Inventor: MingHao Sun, Rockville, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 28 days.

(21) Appl. No.: 18/369,013

(22) Filed: Sep. 15, 2023

(65) Prior Publication Data
US 2025/0094755 A1    Mar. 20, 2025

(51) Int. Cl.
*G06K 19/07* (2006.01)
*G06K 19/077* (2006.01)

(52) U.S. Cl.
CPC ..... *G06K 19/0704* (2013.01); *G06K 19/0775* (2013.01); *G06K 19/07766* (2013.01)

(58) Field of Classification Search
CPC .......... G06K 19/0704; G06K 19/0775; G06K 19/07766
See application file for complete search history.

(56) References Cited

U.S. PATENT DOCUMENTS

| | | | | |
|---|---|---|---|---|
| 2010/0134293 A1* | 6/2010 | Fujishiro | ............ | G08B 13/2431 235/487 |
| 2011/0050165 A1* | 3/2011 | Sato | ................... | G06K 19/0701 320/108 |
| 2013/0200165 A1* | 8/2013 | Downie | ........... | G06K 19/07749 235/492 |
| 2014/0097254 A1* | 4/2014 | Downie | ............. | G06K 19/0715 235/492 |

\* cited by examiner

*Primary Examiner* — Sonji N Johnson

(57) ABSTRACT

An example radio-frequency identification (RFID) tag assembly includes: a first tag comprising: a first antenna configured to receive a first radio-frequency signal; a first circuit interconnected with the first antenna, the first circuit configured to be powered by the first radio-frequency signal and to control the first antenna to transmit first tag identification data; and a converter configured to convert energy from the first radio-frequency signal to storable energy; and a second tag comprising: a second antenna configured to transmit second tag identification data; and a battery configured to store energy to power the second tag and provide the stored energy to the first tag in response to a power sharing condition; wherein the converter is further configured to provide the storable energy to the second tag for storage in the battery in response to a power storage condition.

23 Claims, 6 Drawing Sheets

RADIO-FREQUENCY IDENTIFICATION (RFID) TAG ASSEMBLY

BACKGROUND

Radio-frequency identification tags can be used in applications such as item identification and tracking, smart labels, and access control. Active RFID tags include a battery and may therefore be used for high-value items, however these tags require periodic replacing due to battery consumption. Passive RFID tags are powered by the radio-frequency signal in an interrogation or data request, however these tags have limited range.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
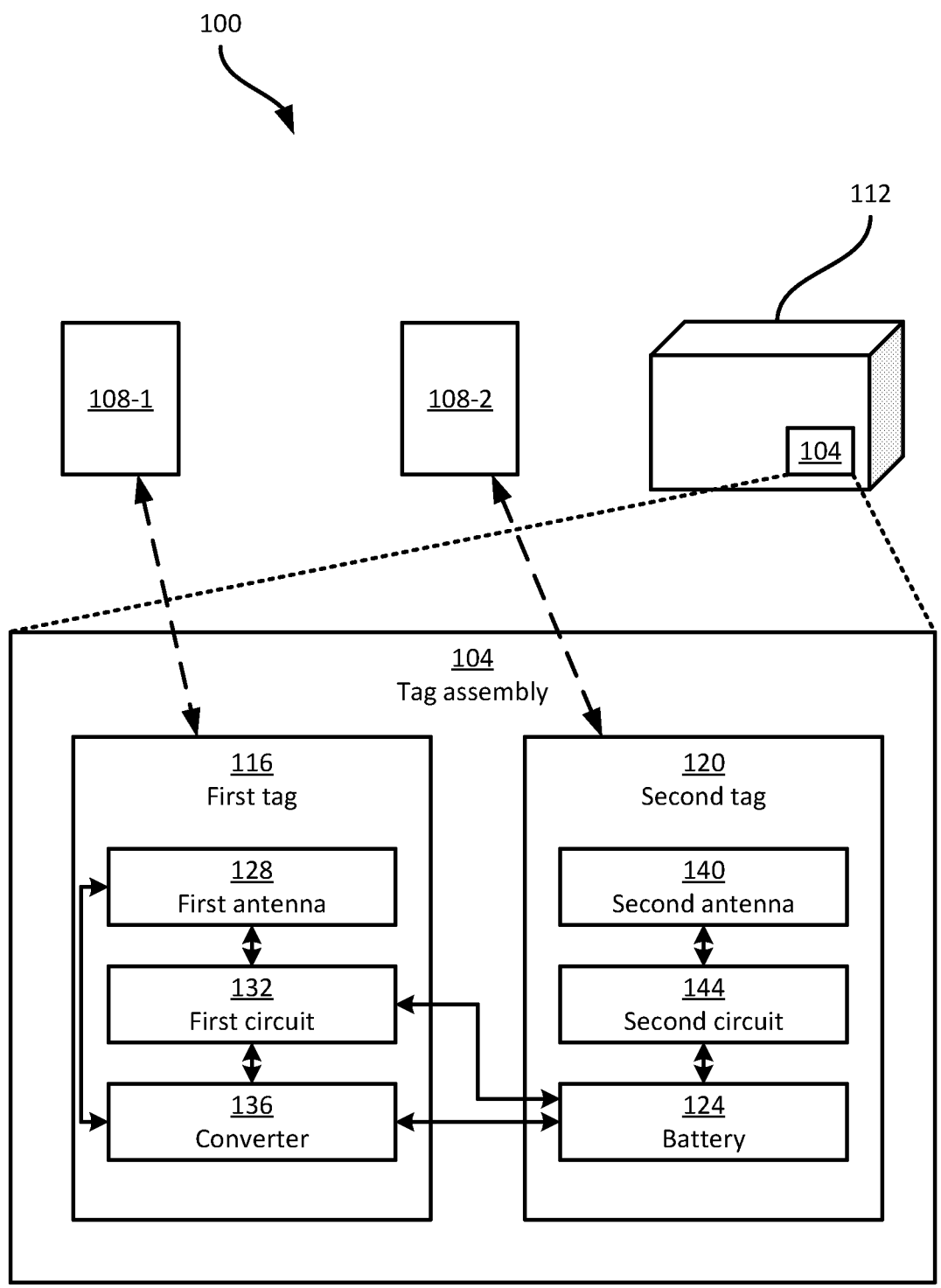
FIG. 1 is a schematic diagram of an example radio frequency identification system with power sharing.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a radio-frequency identification (RFID) tag assembly comprising: a first tag comprising: a first antenna configured to receive a first radio-frequency signal; a first circuit interconnected with the first antenna, the first circuit configured to be powered by the first radio-frequency signal and to control the first antenna to transmit first tag identification data; and a converter configured to convert energy from the first radio-frequency signal to storable energy; and a second tag comprising: a second antenna configured to transmit second tag identification data; and a battery configured to store energy to power the second tag and provide the stored energy to the first tag in response to a power sharing condition; wherein the converter is further configured to provide the storable energy to the second tag for storage in the battery in response to a power storage condition.

Additional examples disclosed herein are directed to a method of power storage in a tag assembly, the method comprising: receiving, at a first tag of the tag assembly, a first radio-frequency (RF) signal including a data request; powering a first circuit of the first tag from the first RF signal to respond to the data request; in response to detecting a power storage condition, converting energy from the first RF signal to storable energy; and storing the storable energy at a battery of a second tag of the tag assembly.

Additional examples disclosed herein are directed to a method of power sharing in a tag assembly, the tag assembly including a first tag configured for a passive tag operation and a second tag configured for an active tag operation, the method comprising: detecting, at the second tag of the tag assembly, a power sharing condition; providing stored energy from a battery of the second tag to the first tag of the tag assembly; providing a first circuit of the first tag with supplemental power from the stored energy; and completing the passive tag operation at the first tag.

Additional examples disclosed herein are directed to a radio-frequency identification (RFID) reader comprising: a communications interface; and a processor interconnected with the communications interface, the processor configured to: in response to an interrogation condition, initiate a data request to a first RFID tag in a tag assembly; control the communications interface to emit a first radio-frequency (RF) signal with the data request and a power storage request to convert, at the first RFID tag, power from the first RF signal to storable energy to be stored at a battery of a second RFID tag in the tag assembly; obtain a response to the data request; and in response to detecting a stop condition, terminate the first RF signal.

FIG. 1 depicts a radio-frequency identification (RFID) tag system 100 in accordance with the teachings of this disclosure. The system 100 includes an RFID tag assembly 104 and one or more RFID tag readers, of which two example readers, 108-1 and 108-2 are depicted. The RFID tag assembly 104 (also referred to herein as simply the tag assembly 104) may be associated with an object 112 such as, but not limited to, a box or package, a product or other item (e.g., in a warehouse or the like), a vehicle or device, or the like.

The tag assembly 104 includes a first tag 116 which is configured to substantially operate as a passive tag, and a second tag 120, which is configured to substantially operate as an active tag. Further, the first tag 116 and the second tag 120 are configured for power sharing. In particular, the first tag 116 is configured to convert energy from a radio-frequency (RF) signal into usable energy in accordance with its capabilities as a passive tag. The second tag 120 includes a battery 124 configured to store energy to power the components of the second tag 120 for use as an active tag. To perform power sharing, the first tag 116 may be configured to transfer the converted usable energy to the second tag 120 for storage in the battery 124, and the second tag 120 may be configured to provide stored energy from the battery 124 to the first tag 116 to allow the first tag 116 to operate under conditions in which the first tag 116 may not otherwise be able to operate independently. For example, the first tag 116 may be provided with sufficient power if interference of the RF signal reduces power to the first tag 116 or to amplify the range of the first tag 116 or the like.

More particularly, the first tag 116 includes a first antenna 128 and a first circuit 132 interconnected with the first antenna 128. The first antenna 128 is configured to receive a first RF signal from a reader, such as the reader 108-1. For example, the first reader 108-1 may be configured for passive RFID tag operations, for item management and tracking, access control, smart labels, or the like. Accordingly, the first reader 108-1 may emit first RF signals configured to be a high-power signal to supply the first tag 116 with sufficient power to operate and respond to a request embedded in the first RF signal. Upon receipt of the first RF signal at the first antenna 128, RF energy is transmitted to the first circuit 132 to wake up the first circuit 132 and enable the first circuit 132 to operate.

The first circuit 132 may be a microchip or integrated circuit (IC) or the like, and may include an integrated memory. The first circuit 132 is generally configured for passive tag operations; that is, in response to an implicit or explicit data request embedded in the first radio-frequency signal, the first circuit 132 is configured to control the first antenna 128 to transmit first tag identification data. For example, the first tag identification data may include an identifier and certain properties relating to the object 112 with which the tag assembly 104 is associated.

In addition to responding to the data request from the first radio-frequency signal, the first tag 116 may be configured to harvest energy from the first radio-frequency signal. Accordingly, the first tag 116 further includes a converter 136 configured to convert energy from the first RF signal to usable and storable energy. For example, the converter 136 may include suitable components, including a charge pump and associated charge pump circuitry, amplifiers, other suitable charging circuitry, and the like to convert an RF signal to storable energy. In some examples, the converter 136 may include a dedicated circuit configured to control the conversion of energy from the first RF signal to storable energy, while in other examples, the conversion operation may be controlled by the first circuit 132. The converter 136 is also interconnected with the battery 124 of the second tag and may provide the battery 124 with the storable energy for storage in the battery 124. That is, the transfer of energy from the first tag 116 to the second tag 120 charges the battery 124 of the second tag 120.

In some examples, the harvesting and conversion of energy from the first RF signal by the converter 136 is initiated in response to a storage request in the first RF signal. That is, the first RF signal may include an embedded storage request or command to instruct the converter 136 to convert energy from the first RF signal to storable energy. In other examples, the converter 136 may be configured to convert any excess energy from the first RF signal after processing the return transmission of the first tag identification data.

The second tag 120 is configured for active tag operations, and accordingly, the second tag 120 includes a second antenna 140, a second circuit 144, and the battery 124. The second antenna 140 is primarily configured for active transmission, and accordingly, is interconnected with the second circuit 144. The second circuit 144 may be a microchip, IC, or the like, and is configured to control the second antenna 140 to actively transmit second tag identification data. For example, the second tag identification data may include an identifier of the object 112 for locationing operations pertaining to the object 112.

In particular, the second circuit 144 may control the second antenna 140 to actively transmit the second tag identification data periodically in the form of a periodic beacon, or selectively, in response to a data request received via the second antenna 140. For example, an RF reader, such as the second reader 108-2 may be configured to send a second RF signal including a data request to the second antenna 140. For example, the second reader 108-2 may be configured for active RFID tag operations, such as for locationing purposes, tracking high-value assets, or the like.

The system 100, and more particularly, the tag assembly 104, is therefore configured for dual RFID tag operations. In some examples, the first tag 116 and the second tag 120 may operate in different frequency bands and under different protocols to avoid interference with one another, and to allow multiple tag operations to be applied to an object 112 with a single tag assembly 104. For example, the first tag 116 may be configured to provision information about the object 112 for object identification or the like, while the second tag 120 may be configured for a locationing operation, to allow the location of the object 112 to be tracked within a facility or the like.

Figure 2:
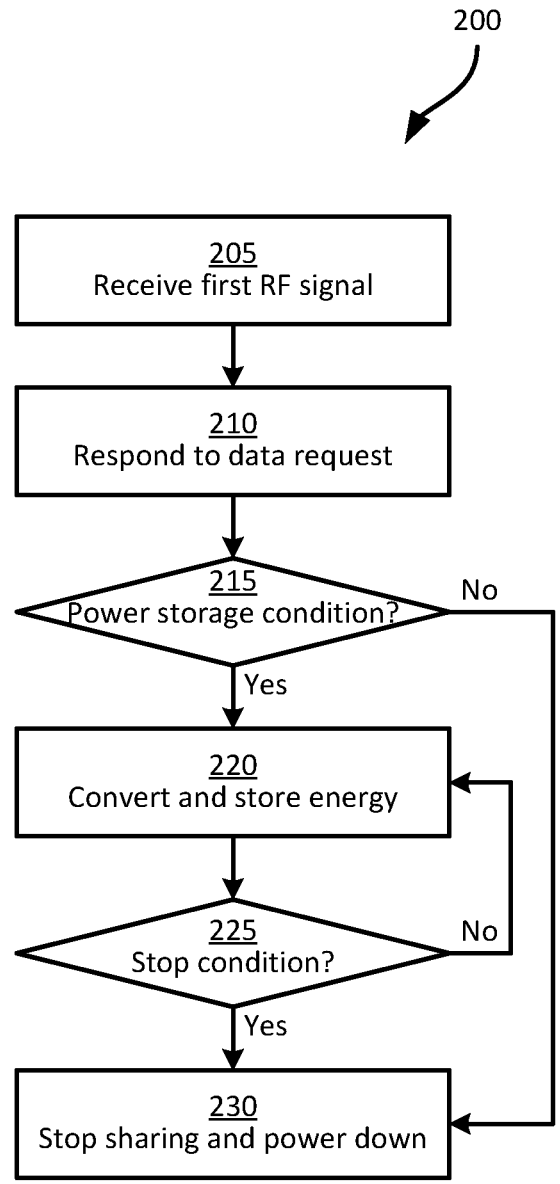
FIG. 2 is a flowchart of a method of power storage in a tag assembly.

Turning now to FIG. 2, the functionality implemented by the tag assembly 104 will be discussed in greater detail. FIG. 2 illustrates a method 200 of power sharing in a tag assembly, and in particular, for power storage from a passive tag subsystem to an active tag subsystem. The method 200 will be discussed in conjunction with its performance in the system 100, and particularly by the tag assembly 104. In other examples, the method 200 may be performed by other suitable devices or systems.

The method 200 is initiated at block 205, where the first antenna 128 receives a first RF signal, for example from the first reader 108-1. In particular, the first RF signal may be within a first frequency band within which the first tag 116 is configured to operate. The first RF signal may be, for example, an interrogation of the first tag 116, and hence may include a data request for information about the first tag 116, the tag assembly 104 or the object 112 associated with the tag assembly 104. Further, the first RF signal may be configured for passive tag operations, and hence may have sufficient energy to power the first circuit 132.

Accordingly, at block 210, the first circuit 132 is powered by the first RF signal and is configured to respond to the data request from the first RF signal. In particular, the first circuit 132 controls the first antenna 128 to transmit first tag identification data. For example, the first circuit 132 may include an integrated memory bank configured to store the first tag identification data to be included in response to a data request at the first tag 116. By nature of the first tag 116 as a passive tag, the first tag identification data may be a predefined set of data, the whole of which is included in the return transmission by default.

In other examples, since the first tag 116 may be provided with supplemental power from the second tag 120, in some examples, the first circuit 132 may be configured to request supplemental power from the second tag 120 in response to the first RF signal received at block 205. Upon receipt of supplemental power from the second tag 120, the first circuit 132 may be configured to process the data request and select a subset of the set of data stored in the memory bank, or otherwise process the predefined set of data stored in the memory bank for inclusion in the return transmission.

At block 215, the converter 136 determines whether a power storage condition is detected. For example, the power storage condition may include a storage request or command received in the first RF signal. In other examples, the power storage condition may be the fact of receipt of the first RF signal itself. Other suitable power storage conditions are also contemplated. In some examples, block 215 may occur substantially contemporaneously with block 210.

For example, the reader 108-1 may issue a storage request when the reader 108-1 is able to generate a signal having at least a predefined duration to provide sufficient energy to power the return transmission of the first tag identification data (i.e., the response to the data request) as well as excess energy to be converted to storable energy for storage in the battery 124. Providing this storage request may reduce attempted and failed conversions of energy when the first RF signal is not sufficient to power both the response to the data request as well as providing excess energy for storage in the battery 124.

If the determination at block 215 is negative, that is, the converter 136 determines that no power storage condition is detected, then the first tag 116 proceeds to block 230.

If the determination at block 215 is affirmative, that is, the converter 136 determines that a power storage condition is detected, then the first tag 116 proceeds to block 220. At block 220, the converter 136 converts energy from the first RF signal received at block 205 to storable energy and provides the storable energy to the second tag 120 for storage in the battery 124. In particular, the converter 136 may use suitable techniques to absorb RF energy within the operating frequency band of the first tag 116. When a power storage condition is detected, charging circuitry of the converter 136 may be activated to initiate the charging of the battery 124, in particular, by completing a circuit between the converter 136 and the battery 124.

At block 225, the converter 136 determines whether a stop condition is detected. For example, the stop condition may include a stop request or command received at the first antenna 128, a battery-full indication from the battery 124 or the second tag 120, detection of termination of the first RF signal (i.e., detection that the first RF signal is no longer being received at the first antenna 128), expiry of a predetermined duration of time, or other suitable stop conditions.

If the determination at block 225 is negative, that is, the converter 136 determines that no stop condition is detected, then the converter 136 returns to block 220 to continue converting energy from the first RF signal and providing the storable energy to the second tag 120 for storage in the battery 124. Accordingly, the converter 136 may proceed to continue charging the battery 124 until a stop condition is detected at block 225.

If the determination at block 225 is affirmative, that is, the converter 136 determines that a stop condition is detected, then the first tag 116 proceeds to block 230. At block 230 the first tag 116 terminates any power sharing from the converter 136 to the battery 124, for example by interrupting the circuit therebetween. Additionally, the components of the first tag 116 may power down, for example due to loss of a power source and consumption of the energy provided in the first RF signal.

Figure 3:
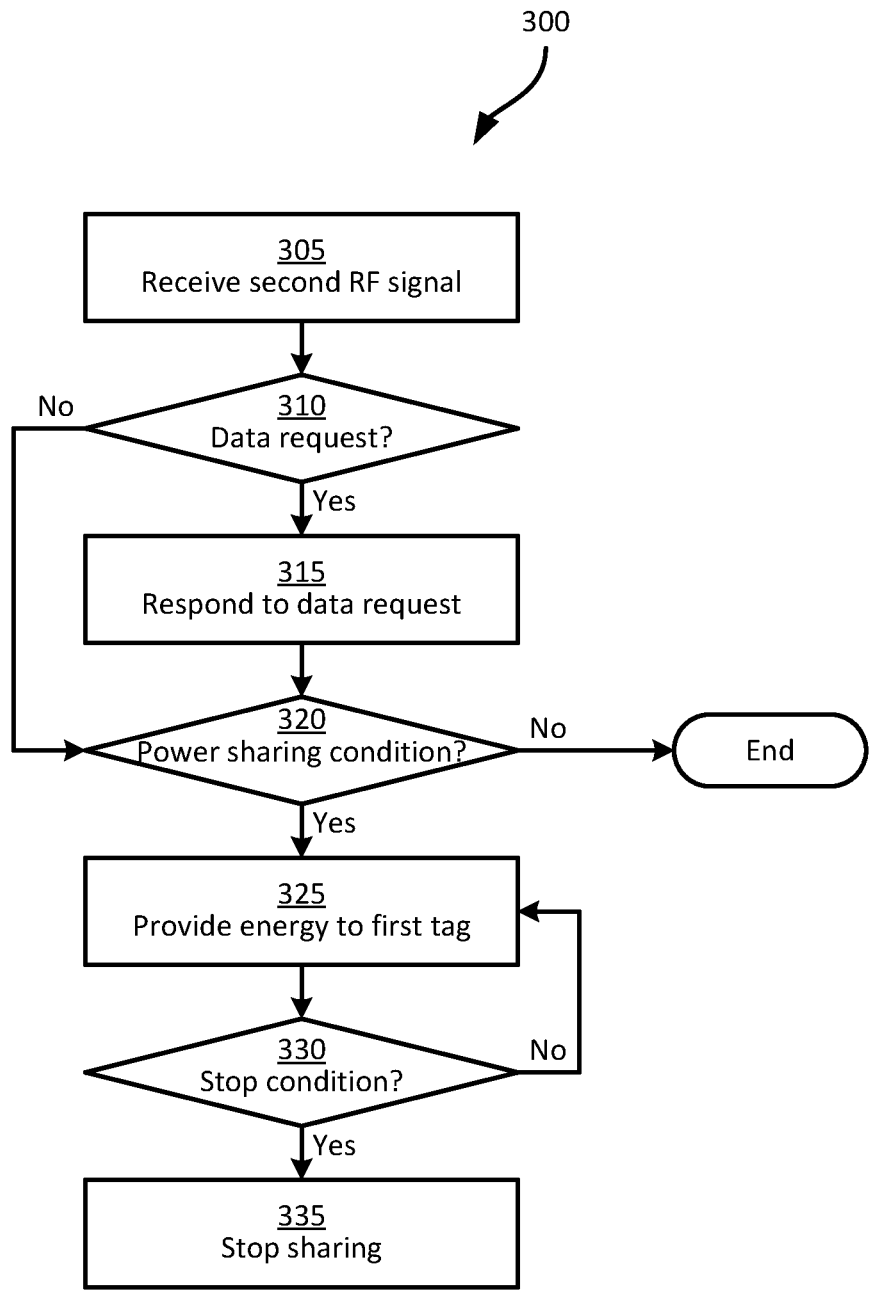
FIG. 3 is a flowchart of a method of power sharing in a tag assembly.

Turning now to FIG. 3, another method 300 of power sharing in a tag assembly, and in particular, from an active tag subsystem to a passive tag subsystem to support the passive tag subsystem is depicted. The method 300 will be discussed in conjunction with its performance in the system 100, and particularly by the tag assembly 104. In other examples, the method 300 may be performed by other suitable devices or systems.

The method 300 is initiated at block 305, where the second antenna 140 receives a second RF signal. In particular, the second RF signal may be within a second frequency band within which the second tag 120 is configured to operate. Preferably, the second frequency band may be distinct from the first frequency band in which the first tag 116 is configured to operate. The second RF signal may be, for example, an interrogation of the second tag 120 and hence may include a data request for information about the second tag 120, the tag assembly 104 or the object 112 associated with the tag assembly 104. For example, the data request may be received from the second reader 108-2 as part of a locationing operation or other suitable operation employing the second tag identification data.

In other examples, the second RF signal may be received from the first reader 108-1 and may include a power sharing request to share power with the first tag 116 to enable certain functionality at the first tag 116. For example, if the first tag 116 is beyond the operational range from the first reader 108-1 at which the first RF signal provides sufficient power for the response, the first reader 108-1 may issue the power sharing request to provide the first tag 116 with supplemental power to extend the operational range of the first tag 116. In another example, if the first reader 108-1 is requesting information beyond the default predefined set of data stored in the memory bank of the first circuit 132, the first circuit 132 may require more power to process the request than is harvestable from the first RF signal. Other reasons for the first reader 108-1 to issue a power sharing request are also contemplated. Further, in some examples, the second RF signal may include both a data request and a power sharing request.

Accordingly, at block 310, the second circuit 144 determines whether a data request is included in the second RF signal.

If the determination at block 310 is affirmative, that is, the second RF signal includes a data request, then the second circuit 144 proceeds to block 315. At block 315, the second circuit 144 is configured to respond to the data request from the second RF signal. In particular, the second circuit 144 controls the second antenna 140 to transmit second tag identification data. For example, the second circuit 144 may include an integrated memory bank, or may be interconnected with a memory, and may be configured to retrieve and/or process data stored in the memory or the memory bank to include in the response to the data request.

In other examples, the second tag 120 may be configured as a beacon—that is, the second circuit 144 may control the second antenna 140 to transmit second tag identification data on a periodic basis as part of a beacon signal.

If the determination at block 310 is negative, or after completion of block 315, the second circuit 144 proceeds to block 320. At block 320, the second circuit 144 determines whether a power sharing condition is detected. For example, the power sharing condition may include a power sharing request or command received in the second RF signal. In other examples, the power sharing request may be received from the first tag 116 itself. Other suitable power sharing conditions are also contemplated. In some examples, block 320 may occur substantially contemporaneously with blocks 310 and 315.

If the determination at block 320 is negative, that is, the second circuit 144 determines that no power sharing condition is detected, then the method 300 may end.

If the determination at block 320 is affirmative, that is, the second circuit 144 determines that a power sharing condition is detected, then the second tag 120 proceeds to block 325. At block 325, the second circuit 144 is configured to control the battery 124 to provide stored energy in the battery 124 to the first tag 116. For example, the second circuit 144 may complete a circuit between the battery 124 and the first circuit 132 to allow power to flow from the battery 124 to the first circuit 132. That is, the battery 124 may provide the first tag 116, and more particularly, the first circuit 132 with supplemental power from the stored energy, allowing the first tag 116 to complete a passive tag operation (e.g., to extend an operational range of the first tag 116, or to simply power the first circuit 132 of the first tag for a response to a data request, or the like).

At block 330, the second circuit 144 determines whether a stop condition is detected. For example, the stop condition may be a stop request or command received at the second antenna 140 or from the first tag 116, a expiry of predetermined duration of power sharing, a predefined amount of power shared, depletion of the power level of the battery 124 below a threshold level, or other suitable stop conditions.

If the determination at block 330 is negative, that is, the second circuit 144 determines that no stop condition is detected, then the second circuit 144 returns to block 325 to continue power sharing from the battery 124 to the first tag 116.

If the determination at block 330 is affirmative, that is, the second circuit 144 determines that a stop condition is detected, then the second circuit 144 proceeds to block 335. At block 335, the second circuit 144 terminates the power sharing from the battery 124 to the first tag 116. For example, the second circuit 144 may interrupt the circuit between the battery 124 and the first circuit 132.

The tag assembly 104 may therefore act as a dual tag, allowing the first tag 116 and the second tag 120 to each act independently, while leveraging power capabilities in each tag 116 and 120 for power sharing within the tag assembly 104. To facilitate the power sharing capabilities of the tag assembly 104, the readers 108-1 and 108-2 may be configured to prompt or initiate the power sharing operations, for example via issuing power storage requests, power sharing requests, and the like.

Figure 4:
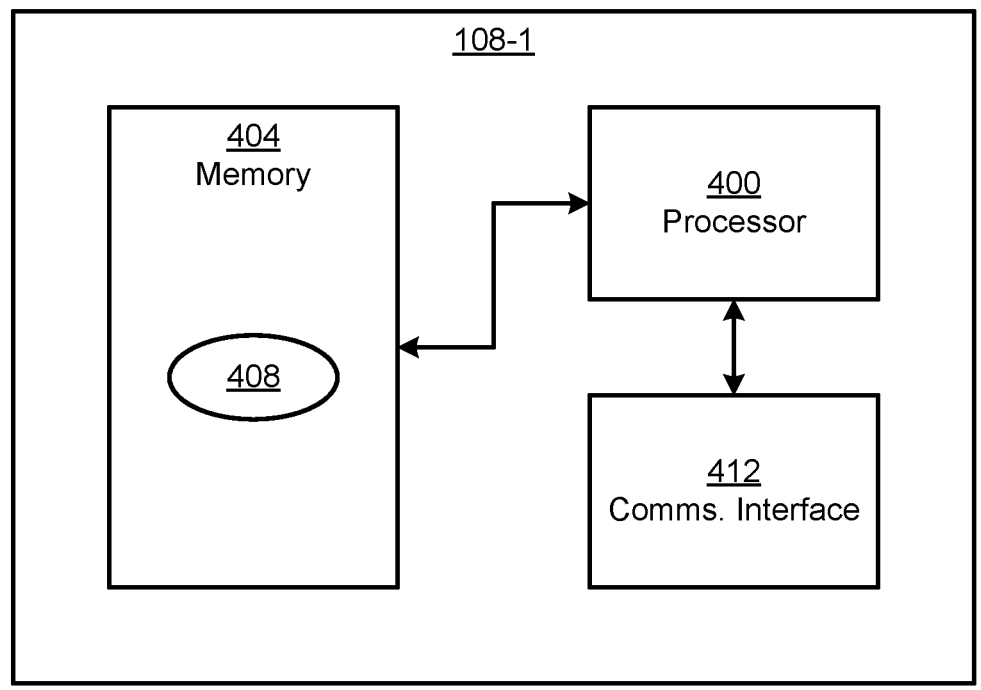
FIG. 4 is a block diagram of certain internal components of the reader 108-1 of the system of FIG. 1.

Turning now to FIG. 4, certain internal components of the reader 108-1 are illustrated. The reader 108-1 may include a processor 400 interconnected with a non-transitory computer-readable storage medium such as a memory 404. The memory 404 includes a combination of volatile memory (e.g. Random Access Memory or RAM) and non-volatile memory (e.g. read only memory or ROM, Electrically Erasable Programmable Read Only Memory or EEPROM, flash memory). The processor 400 and the memory 404 may each comprise one or more integrated circuits.

The memory 404 stores computer-readable instructions for execution by the processor 400. In particular, the memory 404 stores an application 408 which, when executed by the processor, configures the processor 400 to perform various functions discussed below in greater detail and related to facilitating the power sharing operations within a tag assembly. The application 408 may also be implemented as a suite of distinct applications.

Those skilled in the art will appreciate that the functionality implemented by the processor 400 may also be implemented by one or more specially designed hardware and firmware components, such as a field-programmable gate array (FPGAs), application-specific integrated circuits (ASICs) and the like in other embodiments. In an embodiment, the processor 400 may be, respectively, a special purpose processor which may be implemented via dedicated logic circuitry of an ASIC, an FPGA, or the like in order to enhance the processing speed of the operations discussed herein.

The reader 108-1 also includes a communications interface 412 enabling the reader 108-1 to exchange data with other devices such as the tag assembly 104. The communications interface 412 is interconnected with the processor 400 and includes suitable hardware (e.g. transmitters, receivers, network interface controllers and the like) allowing the reader 108-1 to communicate with other devices. The specific components of the communications interface 412 are selected based on the type of network or other links that the reader 108-1 is to communicate over. In particular, the communications interface 412 is at least configured for radio-frequency communications to emit RF signals to the tag assembly 104. The communications interface 412 may further be configured for communications, for example over one or more wired or wireless connections, with a server to transmit first and second tag identification data based on the results of interrogations to the tag assembly 104.

The reader 108-1 may further include one or more input and/or output devices (not shown). The input devices may include one or more buttons, keypads, touch-sensitive display screens or the like for receiving input from an operator. The output devices may further include one or more display screens, sound generators, vibrators, or the like for providing output or feedback to an operator.

Figure 5:
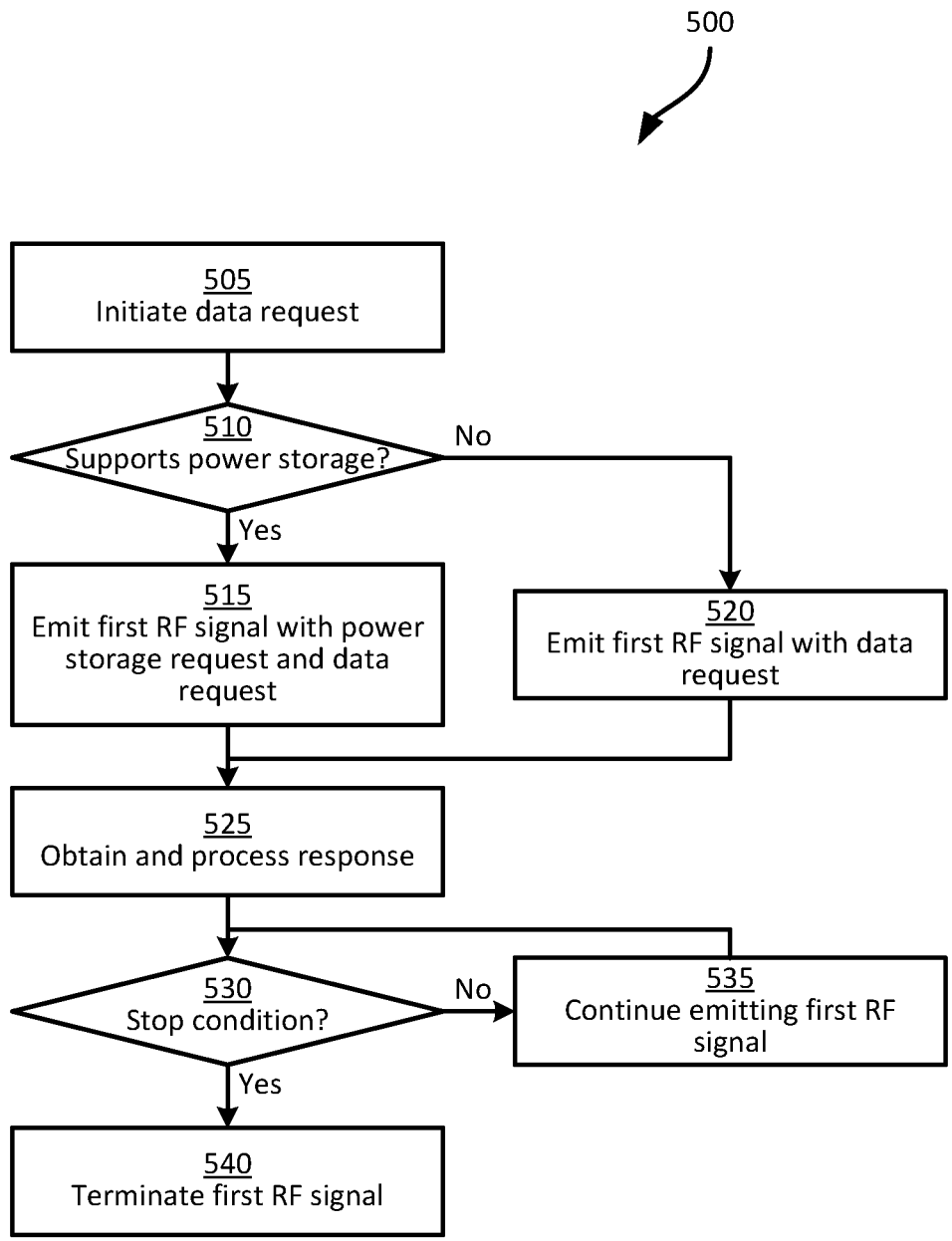
FIG. 5 is a flowchart of an example method of interfacing with a tag assembly with power sharing.

Turning now to FIG. 5, the functionality implemented by the reader 108-1 will be discussed in greater detail. FIG. 5 illustrates a method 500 of interacting with a tag assembly. The method 500 will be discussed in conjunction with its performance in the system 100, and particularly by the reader 108-1, for example via execution of the application 408. In other examples, the method 500 may be performed by other suitable devices or systems.

The method 500 is initiated at block 505, where the reader 108-1 initiates an interrogation or a data request. For example, the reader 108-1 may initiate an interrogation in response to an interrogation condition, such as detection of a nearby RFID tag, in response to a user input, or the like. In other examples, the reader 108-1 may be configured to initiate interrogations at predefined intervals of time, or substantially continuously.

At block 510, the reader 108-1 may determine whether the reader 108-1 can support transmission of a first RF signal with sufficient power to support a power sharing operation, and more particularly a power storage operation for the first tag 116 to convert energy from the first RF signal for storage in the battery 124. For example, the determination may be made based on user input (e.g., by selecting a certain operational mode of the reader 108-1), based on certain contextual or environmental conditions, based on other predefined parameters (e.g., time of day), or the like.

If the determination at block 510 is affirmative, the reader 108-1 proceeds to block 515 to emit a first RF signal together with a power storage request and a data request. If the determination at block 510 is negative, the reader 108-1 proceeds to block 520 to emit a first RF signal together with a data request, while omitting the power storage request. In particular, the first RF signal emitted at either block 515 or 520 may be emitted at an operating frequency of the first tag 116, within the first frequency band.

At block 525, the reader 108-1 may receive and process a response to the data request. In particular, the response may be first tag identification data transmitted by the first tag 116. In some examples, the first tag identification data may be simply received in response to the data request. In other examples, the reader 108-1 may issue additional requests to obtain the response at block 525.

Figure 6:
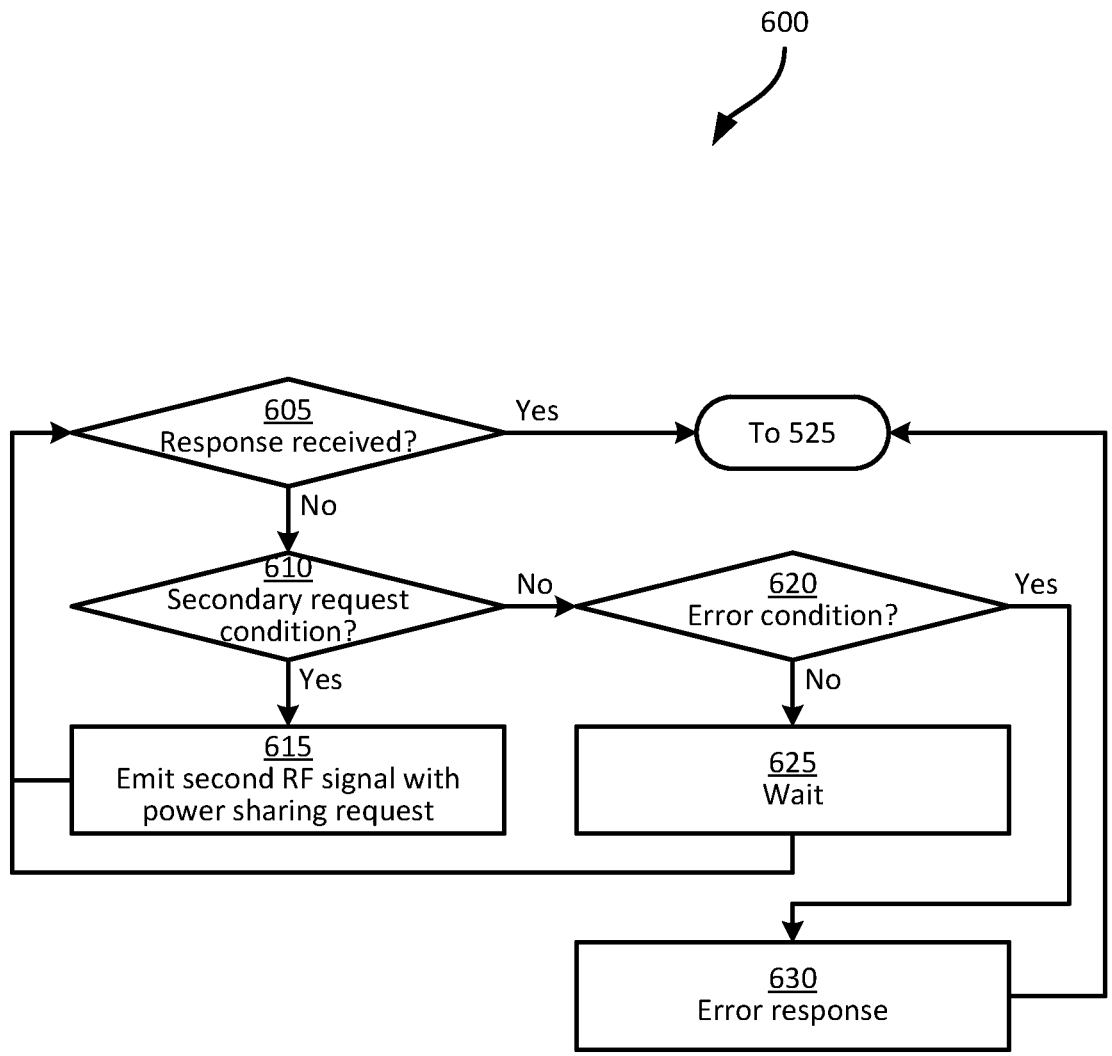
FIG. 6 is a flowchart of an example method of performing block 525 of the method of FIG. 5.

For example, referring to FIG. 6, an example method 600 of obtaining a response is depicted.

At block 605, the reader 108-1 determines whether a response has been received. If a response has been received, the reader 108-1 returns to block 525 to process the response.

If, at block 605, the reader 108-1 determines that a response has not yet been received, the reader 108-1 proceeds to block 610. At block 610, the reader 108-1 determines whether a secondary request condition has been met. For example, the reader 108-1 may determine whether a secondary request for power sharing has been issued. If a secondary request for power sharing has not yet been made, the reader 108-1 may make an affirmative determination at block 610. In some examples, other conditions, including various time constraints, environmental or contextual constraints, or the like, may also contribute to the determination at block 610.

If the determination at block 610 is affirmative, the reader 108-1 emits a second RF signal with a power sharing request. In particular, the second RF signal may be directed to the second tag 120, and hence the second RF signal may be emitted at an operating frequency of the second tag 120, within the second frequency band. The second RF signal includes a power sharing request to initiate power sharing from the battery 124 of the second tag 120 to the first tag 116 to enable the first tag 116 to respond to the data request.

After emitting the second RF signal with the power sharing request at block 615, the reader 108-1 may then return to block 605 to determine whether a response has been received.

If no response is still received, then at the second iteration of block 610, the reader 108-1 may make a negative determination at block 610. Similarly, other conditions may also contribute to the determination at block 610.

If the determination at block 610 is negative, the reader 108-1 proceeds to block 620. At block 620, the reader 108-1 determines whether an error condition has been detected. For example, the error condition may be a timeout condition of an expected response time, in consideration of both the initial data request, and a subsequent power sharing request. In other examples, other factors may contribute to the determination of an error condition.

If no error detection is detected at block 620, the reader 108-1 continues to block 625 to wait for a response and returns to block 605 to determine whether a response is received. The reader 108-1 may continue to iterate through the method 600 until a response is received at block 605 or an error condition is detected at block 620.

If an error condition is detected at block 620, the reader 108-1 proceeds to block 630 to identify the error condition as the response. That is, the reader 108-1 may return to block 525 with an indicator of the error condition as the response obtained and to be processed at block 525.

Returning to FIG. 5, the response obtained at block 525 may be processed in accordance with the context in which the data request was initiated. For example, the reader 108-1 may send the first tag identification data to an interconnected computing device and/or server for asset tracking in a transportation and logistics context, for purchase processing in a smart label context, or similar.

At block 530, the reader 108-1 determines whether a stop condition for emitting the first RF signal has been detected. For example, if no power storage request was included in the first RF signal, receipt of the response at block 525 may indicate a stop condition to terminate transmission of the first RF signal. If a power storage request was included in the first RF signal, the stop condition may include expiry of a predetermined duration for the first RF signal, receipt of a stop request from the first tag 116, or other suitable stop conditions.

If the determination at block 530 is negative, then at block 535, the reader 108-1 continues emitting the first RF signal. The reader 108-1 may then return to block 530 to continue iterating until a stop condition is detected.

If the determination at block 530 is affirmative, then at block 540, the reader 108-1 terminates transmission of the first RF signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A radio-frequency identification (RFID) tag assembly comprising:
   a first tag comprising:
      a first antenna configured to receive a first radio-frequency signal;
      a first circuit interconnected with the first antenna, the first circuit configured to be powered by the first radio-frequency signal and to control the first antenna to transmit first tag identification data; and
      a converter configured to convert energy from the first radio-frequency signal to storable energy without storing the storable energy in the first tag;
   a second tag comprising:
      a second antenna configured to transmit second tag identification data; and
      a battery configured to store energy to power the second tag and provide the stored energy to the first tag in response to a power sharing condition;
      wherein the converter is further configured to provide the storable energy to the second tag for storage in the battery in response to a power storage condition.

2. The RFID tag assembly of claim 1, wherein the power storage condition comprises a storage request in the first radio-frequency signal.

3. The RFID tag assembly of claim 1, wherein the converter is configured to stop providing the storable energy to the second tag in response to a stop condition.

4. The RFID tag assembly of claim 3, wherein the stop condition comprises one or more of: a battery-full indication from the battery, a stop request received at the first antenna, detection of termination of the first radio-frequency signal, and expiry of a predetermined duration.

5. The RFID tag assembly of claim 1, wherein the power sharing condition comprises one or more of: a first sharing request received from the first tag; and a second sharing request received via the second antenna.

6. The RFID tag assembly of claim 1, wherein the battery is configured to stop providing stored energy to the first tag in response to a stop condition.

7. The RFID tag assembly of claim 6, wherein the stop condition comprises one or more of: a first stop request received from the first tag, a second stop request received at the second antenna, expiry of a predetermined duration, and depletion of a power level of the battery below a threshold.

8. The RFID tag assembly of claim 1, wherein the second antenna is configured to transmit the second tag identification data via a periodic beacon.

9. The RFID tag assembly of claim 1, wherein the second antenna is configured to transmit the second tag identification data in response to a data request received via the second antenna.

10. The RFID tag assembly of claim 1, wherein the first antenna is configured to transmit the first tag identification data over a first frequency band, and the second antenna is configured to transmit the second tag identification data over a second frequency band distinct from the first frequency band.

11. A method of power storage in a tag assembly, the method comprising:
   receiving, at a first tag of the tag assembly, a first radio-frequency (RF) signal including a data request;
   powering a first circuit of the first tag from the first RF signal to respond to the data request;
   in response to detecting a power storage condition, converting energy from the first RF signal to storable energy without storing the storable energy in the first tag; and
   storing the storable energy at a battery of a second tag of the tag assembly.

12. The method of claim 11, wherein detecting the power storage condition comprises detecting, in the first RF signal, a power storage request.

13. The method of claim 11, further comprising: in response to detecting a stop condition, terminating storing the storable energy at the battery of the second tag of the tag assembly.

14. The method of claim 13, wherein detecting the stop condition comprises one or more of:
   receiving a battery-full indication from the battery;
   receiving a stop request at a first antenna of the first tag;
   detecting of termination of the first RF signal; and
   expiry of a predetermined duration.

15. A method of power sharing in a tag assembly, the tag assembly including a first tag and a second tag, the method comprising:
   detecting, at the second tag of the tag assembly, a power sharing condition;
   providing stored energy from a battery of the second tag to the first tag of the tag assembly;
   providing a first circuit of the first tag with supplemental power from the stored energy; and
   completing the passive tag operation at the first tag,
   wherein the first tag is configured for a passive tag operation and the second tag configured for an active tag operation.

16. The method of claim 15, wherein detecting the power sharing condition comprises receiving a power sharing request from the first tag.

17. The method of claim 16, wherein the second RF signal further includes a data request, the method further comprising responding to the data request.

18. The method of claim 15, wherein detecting the power sharing condition comprises receiving a power sharing request in a second radio-frequency (RF) signal.

19. The method of claim 15, further comprising: in response to detecting a stop condition, terminating providing the stored energy from the battery to the first tag.

20. The method of claim 19, wherein detecting the stop condition comprises one or more of:
 receiving a first stop request from the first tag;
 receiving a second stop request at an antenna of the second tag;
 detecting expiry of a predetermined duration; and
 detecting depletion of a power level of the battery below a threshold level.

21. A radio-frequency identification (RFID) reader comprising:
 a communications interface; and
 a processor interconnected with the communications interface, the processor configured to:
  in response to an interrogation condition, initiate a data request to a first RFID tag in a tag assembly;
  control the communications interface to emit a first radio-frequency (RF) signal with the data request and a power storage request to convert, at the first RFID tag, power from the first RF signal to storable energy without storing the storable energy in the first tag, the storable energy being stored at a battery of a second RFID tag in the tag assembly;
  obtain a response to the data request; and
  in response to detecting a stop condition, terminate the first RF signal.

22. The RFID reader of claim 21, wherein the processor is further configured to: in response to a secondary request condition, emit a second RF signal with a power sharing request to the second RFID tag to provide stored energy from the battery to the first RFID.

23. The RFID reader of claim 22, wherein the first RF signal is emitted in a first frequency band, and the second RF signal is emitted in a second frequency band distinct from the first frequency band.

* * * * *